No. 841,471. PATENTED JAN. 15, 1907.
E. VALLENTINE.
FEEDER.
APPLICATION FILED SEPT. 14, 1905.

Witnesses
J. M. Sterne.
H. H. Cutter.

Inventor
Edward Vallentine,
by Webster & Co.,
Attorneys

UNITED STATES PATENT OFFICE.

EDWARD VALLENTINE, OF FLORENCE, MASSACHUSETTS.

FEEDER.

No. 841,471.     Specification of Letters Patent.     Patented Jan. 15, 1907.

Application filed September 14, 1905. Serial No. 278,450.

*To all whom it may concern:*

Be it known that I, EDWARD VALLENTINE, a citizen of the United States of America, residing at Florence, in the county of Hampshire and Commonwealth of Massachusetts, have invented a new and useful Feeder, of which the following is a specification.

My invention relates to machines which are designed to feed objects, such as buttons and the like, in a predetermined manner—that is to say, to present or deliver each object in some special condition or position the same as every other object handled by the machine; and it consists, essentially, of a spout, conduit, or chute of peculiar construction and means for supplying the objects to such member, as hereinafter set forth.

The primary object of my invention is to provide a machine for automatically feeding irregular-shaped objects or articles with uniformity, accuracy, and despatch.

Secondary objects are to produce such a machine which is durable, very simple in construction and operation, and comparatively inexpensive and to afford means for properly adjusting the two principal members of the machine.

I attain these objects by the mechanism illustrated in the accompanying drawings, in which—

Figures 1, 3, 4:
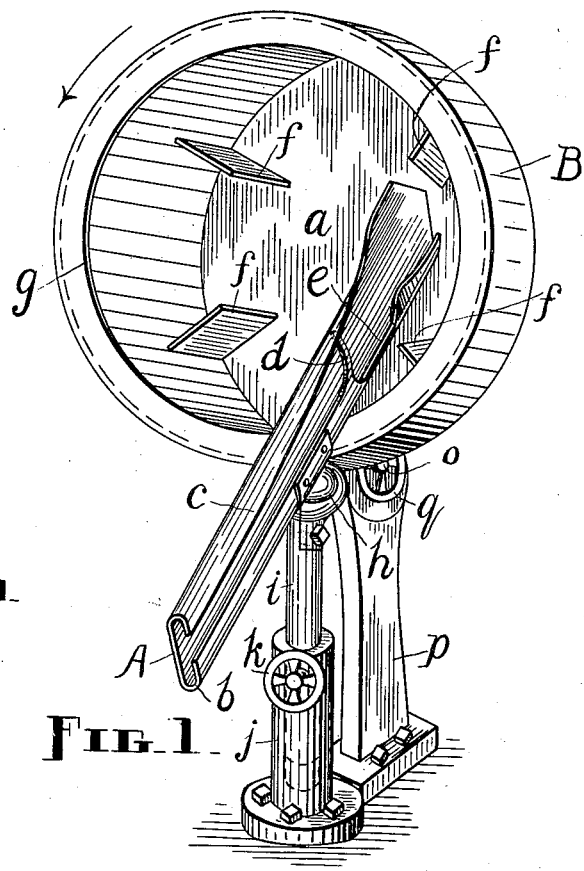
Figure 2:
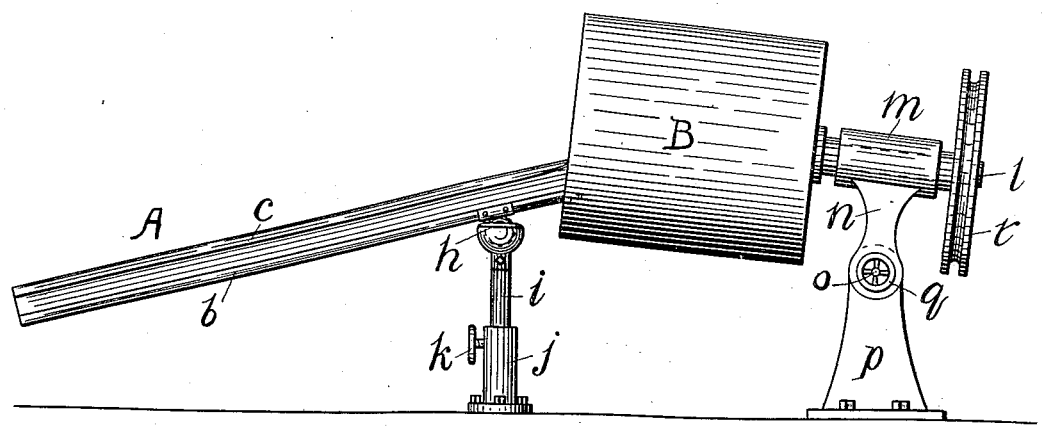

Figure 1 is a perspective view of a machine embodying my invention looking into the tumbler; Fig. 2, a side elevation, reduced, of the feeder; Fig. 3, a cross-section through the chute immediately in front of the selector, showing an object, such as a button, in position to pass clear through said chute; and Fig. 4, a similar cross-section showing the object reversely positioned, so that it will not pass between said selector and the adjacent side of the chute, but must fall out of the chute upon arriving at the selector.

Heretofore much difficulty has been experienced in feeding irregular-shaped articles during the course of their manufacture or while being handled for other purposes, and it is to escape this difficulty I have produced my machine. As a concrete example of the above the feeding of buttons between certain stages of their manufacture may be instanced. In this case it is necessary that the buttons after passing through one machine be presented to another machine with their protuberances always at the right-hand side, for example, and with this feeder I am able to so present them automatically and with great rapidity, if desired.

My feeder comprises, generally, a chute properly constructed to receive and deliver the particular objects which it is designed to handle and provided with a selector at some point between its ends, and a revoluble barrel or tumbler provided with interior shelves, wings, buckets, or projections. The tumbler is inclined out of the horizontal and the chute is inclined out of both the horizontal and vertical, or in any event the high terminal of the chute must be inclined out of the vertical. Such terminal of the chute is within the tumbler near its back end, the arrangement of parts being such that the projections in said tumbler clear the chute when the tumbler revolves. The projections extend inwardly from the sides of the tumbler, and each preferably extends from a point remote from the front end of said tumbler to the back of the same.

What may be termed the "inner" terminal of the chute—that is, the higher part, which is within the tumbler—is constructed in the manner described hereinafter to receive objects carried up by the projections and drop into the same, the selector permitting such objects as fall properly into said chute to escape therefrom and causing such objects as do not fall properly to leave the chute and drop into the tumbler again. Gravity is depended upon for the passage of the objects through the chute and for the proper presentation of the objects to the chute, both in the first instance and thereafter as often as they are rejected by the selector, the rotary motion of the tumbler assisting in the second case.

The foregoing relates to a preferred form of my feeder; but it is clear that the chute, which is in reality the most important feature of my invention, might be used with some other device besides the tumbler for supplying the objects thereto. In fact, they could be supplied by hand, although not to much advantage it is believed.

Since it is generally desirable that the chute and tumbler be adjustable, both on the individual account of each and relative to each other, I usually provide means for this purpose; but it is to be understood that I do not confine myself to the means herein shown and described, because any other may be substituted or such means can be dispensed with altogether.

Referring now to the drawings, in which like letters designate like parts, it will be observed that a chute is represented at A and a tumbler at B, the former being inclined upward from front to rear and extending into said tumbler, while the latter is inclined downward from front to rear. The rear or extreme inner end of the chute A is very close to the back $a$ of the tumbler B. In addition to the inclination just described of the chute, which should be sufficient for buttons, the objects fed by this particular machine, to roll down freely, said chute is tilted enough from above downward to the right when facing said machine to prevent said buttons from falling out of the inner receiving end of the chute before the selector is reached. Suitable supports, presently to be described, are provided to adjustably hold the chute and tumbler in the positions just noted.

The chute A comprises a bottom flange or runway $b$ and an upper flange $c$. About midway between the ends of the chute the flange $c$ commences to open up, from which point it gradually unfolds until near the upper end, where for some distance the flange changes shape altogether and becomes a part of the straight side of the chute. At a point somewhere between the ends of the chute, but within the tumbler B, a finger or selector $d$ rises from the runway $b$ and curves over until its upper end is close to or in contact with the side of the chute. Behind the base of the selector $d$ a portion of the rising part or side of the flange or runway $b$ is cut away nearly or quite down to the bottom of said runway to form an opening $e$. Back of the opening $e$ the runway $b$ continues to the inner end of the chute, being bent outward more or less as desired.

The shape of the chute and the form of the selector will vary according to the use to which said chute is to be put, it not being essential that the exact shape and form shown be adhered to; but in any event the same general features will be maintained.

On the inside of the tumbler B is a plurality of projections $f$, four in the present case; but there may be more or less than that number. Each of these projections extends inward from the side of the tumbler and from a point intermediate of the ends of said tumbler to the back $a$. The arrangement of parts is such that as each projection $f$ is carried by the revolving tumbler through the upper right-hand quadrant of the space within said tumbler said projection passes over the inner terminal of the chute A. Objects placed loosely in the revolving tumbler will always have a tendency to work toward the back $a$, owing to the tilted condition of said tumbler and to the motion imparted thereto, and a portion of such objects will be taken up by each projection as it ascends and will slide off of the same soon after it passes into the upper right-hand quadrant, the arrow in Fig. 1 denoting the direction of rotation. In order to prevent objects in the tumbler from escaping through the front end thereof, an inturned flange $g$ may be provided around the mouth of the tumbler.

The chute A is rigidly fastened to the ball of a universal joint $h$ on top of a shank $i$. Said shank has its lower terminal fitted to move up and down in an upright or pedestal $j$, a hand-wheel set-screw $k$ being employed to retain the shank with its joint and the attached chute at the desired elevation. The support just described enables me easily and quickly to adjust the chute at any height and angle desired.

A shaft $l$, having the same axis as that of the tumbler B, extends rearwardly from the back $a$, to which it is secured at one end. Said shaft is journaled in a bearing $m$, from the bottom of which an arm $n$ depends. The arm $n$ is pivoted at $o$ to an upright or pedestal $p$ and is so mounted thereon that it can be held in place or released through the medium of a hand-wheel $q$ on one end of the bolt or pivot $o$. This adjustable support for the tumbler permits the same to be readily positioned at any required angle to the horizon. These adjustments of the chute and tumbler are needed so as to be able to bring the inner terminal of the former and the projections in the latter into exactly the proper relation to each other.

Means for adjusting the chute or the tumbler, or both, toward and away from the other or each other may be provided; but it is not thought such provision will usually be necessary.

The pedestals $j$ and $p$ are here shown as being bolted to the floor, and of course the position of either can be changed without much difficulty should occasion require.

A grooved pulley $r$ is keyed or otherwise made fast on the rear terminal of the shaft $l$ and belted to any suitable driving-motor. The pulley $r$ when revolved causes the tumbler to revolve. The groove in the pulley $r$ should be quite deep to accommodate the driving-belt (not shown) to the angle at which said pulley stands.

In practice after the members have been properly adjusted a quantity of buttons is placed in the tumbler B and the latter set in motion. Each button $s$ has a protuberance $s'$ on one side, which when next to the side of the chute A, as shown in Fig. 4, causes the disk part of the button to stand off from the side of said chute so that it will encounter the selector $d$; but when such disk part comes next to the side of the chute, as shown in Fig. 3, the button can and does pass said selector and roll freely down the chute. With the tumbler revolving in the direction indicated each projection $f$ as it ascends at the right carries up with it and upon it a portion of the buttons in said tumbler to deliver to the chute, such delivery being effected merely by gravity, the buttons slipping off of the projection at the time the latter arrives at a position where its downward inclination is so great that said buttons can no longer remain thereon, but must slide off, some dropping into the inner terminal of the chute and others falling to the bottom of the tumbler. The buttons that are caught by the inner terminal of the chute are in position to roll down, which they immediately proceed to do until the selector $d$ is reached, when the buttons standing as shown in Fig. 3 pass on and escape at the lower end of the chute, while those standing as shown in Fig. 4 are turned out of their course by said selector, roll or fall off of the runway $b$ through the opening $e$, and drop back into the tumbler. The projections $f$ present practically a constant stream of buttons to the chute, those which are rejected by the selector quickly moving down toward the rear in the tumbler until they are again in the path of the projections, which take them up and give them another trial and as many trials as may be necessary to finally dispose of them. The buttons which fail to lodge in the chute are also taken up by the projections and discharged over or into the chute as often as may be required.

It will now be seen that without rotating the tumbler with so much velocity as to interfere in any way with the proper operation of the machine a steady stream or constant procession of buttons can be kept coming from the discharge end of the chute, the buttons all standing with their protuberances on the same side. The machine will continue to deliver buttons until the last one in the tumbler has been properly presented to the selector $d$ and has emerged from the chute.

By employing projections or buckets of different shapes the location of the inner terminal of the chute relative to such projections or buckets can be changed considerably.

In addition to the structural and other changes, alterations, and rearrangements hereinbefore pointed out others will occur to one skilled in the art, and all such I desire to include within the scope of my claims.

What I claim as my invention, and desire to secure by Letters Patent, is—

1. A chute, for a feeder, comprising a runway along the lower edge, such runway consisting in part of an upwardly-extending flange, and a finger or selector rising from said flange at a point remote from either end of the chute and projecting across the passage in the chute, the upper terminal of said selector being contiguous to the side wall of the chute.

2. A chute, for a feeder, comprising a runway along the lower edge, such runway consisting in part of an upwardly-extending flange, and a finger or selector rising from said flange at a point remote from either end of the chute and projecting across the passage in the chute, a portion of the flange back of the base of said selector being cut away so as to form a side opening in the runway but leaving the bottom of the runway intact.

3. The combination, in a feeder, with a stationary chute provided with a selector lying across the passage therein but not entirely obstructing the same, such selector being adapted to bar said passage to some objects and to afford no obstruction to others, which latter are permitted to pass between the side of said chute and said selector, according to the positions of the objects in the chute, of adjustable means of support for the chute.

4. The combination, in a feeder, with a rotary tumbler inclined axially downward from front to rear and provided with internal projections, of a chute inclined to the horizon and having its highest and receiving terminal tilted laterally and located within said tumbler.

5. The combination, in a feeder, with a rotary tumbler inclined axially and provided with internal projections, of an inclined chute having its higher terminal located within said tumbler and provided with a selector also located within the tumbler and lying across the passage in such chute but not entirely obstructing such passage, such selector being adapted to bar the passage to some objects and to afford no obstruction to others, which latter are permitted to pass between the side of the chute and said selector, according to the positions of the objects in said chute, the objects being delivered to the chute from the tumbler through the medium of said projections therein.

6. In a feeder, the combination of a rotating lifting device having an inwardly-projecting member to lift the articles being fed, said lifting device being inclined downwardly at its rear end, an adjustable support for the lifting device, and a chute projecting into such device and with its inner terminal arranged to receive the articles being fed as they fall from said inwardly-projecting member.

7. The combination, in a feeder, with a rotary tumbler inclined axially and provided with internal projections of less length than said tumbler, of an inclined chute having its higher terminal located within the tumbler and provided with a selector situated within and adjacent to parts of the tumbler which are clear of said projections and lying across the passage in such chute but not entirely obstructing such passage, such selector being adapted to bar the passage to some objects and to afford no obstruction to others, which latter are permitted to pass between the side of the chute and said selector, according to the positions of the objects in the chute, the objects being delivered to the chute from the tumbler through the medium of the projections therein.

In testimony whereof I have signed my name to this specification in the presence of two subscribing witnesses.

EDWARD VALLENTINE.

Witnesses:
 ALLEN WEBSTER,
 F. A. CUTTER.